United States Patent
Harel et al.

(10) Patent No.: US 9,042,276 B1
(45) Date of Patent: May 26, 2015

(54) MULTIPLE CO-LOCATED MULTI-USER-MIMO ACCESS POINTS

(71) Applicant: Magnolia Broadband Inc., Englewood, NJ (US)

(72) Inventors: Haim Harel, New York, NY (US); Stuart S. Jeffery, Los Altos, CA (US); Kenneth Kludt, San Jose, CA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/097,765

(22) Filed: Dec. 5, 2013

(51) Int. Cl.
| | |
|---|---|
| *H04B 7/00* | (2006.01) |
| *H04B 7/005* | (2006.01) |
| *H04W 4/00* | (2009.01) |
| *H04B 7/02* | (2006.01) |
| *H04B 1/04* | (2006.01) |
| *H04J 3/16* | (2006.01) |
| *H04B 7/04* | (2006.01) |
| *H04L 5/14* | (2006.01) |
| *H04W 88/08* | (2009.01) |
| *H04W 76/00* | (2009.01) |
| *H04W 72/04* | (2009.01) |

(52) U.S. Cl.
CPC ............ *H04J 3/1694* (2013.01); *H04B 7/0408* (2013.01); *H04L 5/14* (2013.01); *H04W 88/08* (2013.01); *H04W 76/00* (2013.01); *H04W 72/04* (2013.01); *H04L 5/1423* (2013.01)

(58) Field of Classification Search
CPC ....... H04L 5/14; H04L 5/1423; H04W 72/04; H04W 88/08; H04W 76/00
See application file for complete search history.

(56) References Cited

U.S. PATENT DOCUMENTS

| | | | |
|---|---|---|---|
| 4,044,359 | A | 8/1977 | Applebaum et al. |
| 4,079,318 | A | 3/1978 | Kinoshita |
| 4,359,738 | A | 11/1982 | Lewis |
| 4,540,985 | A | 9/1985 | Clancy et al. |
| 4,628,320 | A | 12/1986 | Downie |
| 5,162,805 | A | 11/1992 | Cantrell |
| 5,363,104 | A | 11/1994 | Richmond |
| 5,444,762 | A | 8/1995 | Frey et al. |
| 5,732,075 | A | 3/1998 | Tangemann et al. |
| 5,915,215 | A | 6/1999 | Williams et al. |

(Continued)

FOREIGN PATENT DOCUMENTS

| | | |
|---|---|---|
| EP | 1 189 303 | 3/2002 |
| EP | 1 867 177 | 5/2010 |

(Continued)

OTHER PUBLICATIONS

U.S. Appl. No. 13/858,302, filed Apr. 8, 2013, Harel, et al.

(Continued)

*Primary Examiner* — Hassan Phillips
*Assistant Examiner* — Lonnie Sweet
(74) *Attorney, Agent, or Firm* — Pearl Cohen Zedek Latzer Baratz LLP

(57) ABSTRACT

A wireless communication system may include a plurality of N co-located Wi-Fi access points, each configured to communicate with at least one user equipment. The system may further include a beamformer coupled to each of the access points and coupled to at least one antenna array. The antenna array may include a plurality of antenna elements and may be configured to provide a plurality of M spatially uncorrelated beams for a coverage area of each of the N access points.

17 Claims, 11 Drawing Sheets

(56) References Cited

U.S. PATENT DOCUMENTS

| | | |
|---|---|---|
| 5,936,577 A | 8/1999 | Shoki et al. |
| 5,940,033 A | 8/1999 | Locher et al. |
| 6,018,317 A | 1/2000 | Dogan et al. |
| 6,026,081 A | 2/2000 | Hamabe |
| 6,046,655 A | 4/2000 | Cipolla |
| 6,101,399 A | 8/2000 | Raleigh et al. |
| 6,163,695 A | 12/2000 | Takemura |
| 6,167,286 A | 12/2000 | Ward et al. |
| 6,215,812 B1 | 4/2001 | Young et al. |
| 6,226,507 B1 | 5/2001 | Ramesh et al. |
| 6,230,123 B1 | 5/2001 | Mekuria et al. |
| 6,259,683 B1 | 7/2001 | Sekine et al. |
| 6,297,772 B1 | 10/2001 | Lewis |
| 6,321,077 B1 | 11/2001 | Saitoh et al. |
| 6,335,953 B1 | 1/2002 | Sanderford et al. |
| 6,370,378 B1 | 4/2002 | Yahagi |
| 6,377,783 B1 | 4/2002 | Lo et al. |
| 6,393,282 B1 | 5/2002 | Iimori |
| 6,584,115 B1 | 6/2003 | Suzuki |
| 6,697,622 B1 | 2/2004 | Ishikawa et al. |
| 6,697,633 B1 | 2/2004 | Dogan et al. |
| 6,834,073 B1 | 12/2004 | Miller et al. |
| 6,842,460 B1 | 1/2005 | Olkkonen et al. |
| 6,914,890 B1 | 7/2005 | Tobita et al. |
| 6,927,646 B2 | 8/2005 | Niemi |
| 6,975,582 B1 | 12/2005 | Karabinis et al. |
| 6,987,958 B1 | 1/2006 | Lo et al. |
| 7,068,628 B2 | 6/2006 | Li et al. |
| 7,177,663 B2 | 2/2007 | Axness et al. |
| 7,190,964 B2 | 3/2007 | Damnjanovic et al. |
| 7,257,425 B2 | 8/2007 | Wang et al. |
| 7,299,072 B2 | 11/2007 | Ninomiya |
| 7,391,757 B2 | 6/2008 | Haddad et al. |
| 7,392,015 B1 | 6/2008 | Farlow et al. |
| 7,474,676 B2 | 1/2009 | Tao et al. |
| 7,499,109 B2 | 3/2009 | Kim et al. |
| 7,512,083 B2 | 3/2009 | Li |
| 7,606,528 B2 | 10/2009 | Mesecher |
| 7,634,015 B2 | 12/2009 | Waxman |
| 7,646,744 B2 | 1/2010 | Li |
| 7,719,993 B2 | 5/2010 | Li et al. |
| 7,742,000 B2 | 6/2010 | Mohamadi |
| 7,769,107 B2 | 8/2010 | Sandhu et al. |
| 7,898,478 B2 | 3/2011 | Niu et al. |
| 7,904,086 B2 | 3/2011 | Kundu et al. |
| 7,933,255 B2 | 4/2011 | Li |
| 7,970,366 B2 | 6/2011 | Arita et al. |
| 8,078,109 B1 | 12/2011 | Mulcay |
| 8,103,284 B2 | 1/2012 | Mueckenheim et al. |
| 8,115,679 B2 | 2/2012 | Falk |
| 8,155,613 B2 | 4/2012 | Kent et al. |
| 8,275,377 B2 | 9/2012 | Nanda et al. |
| 8,280,443 B2 | 10/2012 | Tao et al. |
| 8,294,625 B2 | 10/2012 | Kittinger et al. |
| 8,306,012 B2 | 11/2012 | Lindoff et al. |
| 8,315,671 B2 | 11/2012 | Kuwahara et al. |
| 8,369,436 B2 | 2/2013 | Stirling-Gallacher |
| 8,509,190 B2 | 8/2013 | Rofougaran |
| 8,520,657 B2 | 8/2013 | Rofougaran |
| 8,526,886 B2 | 9/2013 | Wu et al. |
| 8,588,844 B2 | 11/2013 | Shpak |
| 8,599,955 B1 | 12/2013 | Kludt et al. |
| 8,599,979 B2 | 12/2013 | Farag et al. |
| 8,611,288 B1 | 12/2013 | Zhang et al. |
| 8,644,413 B2 | 2/2014 | Harel et al. |
| 8,649,458 B2 | 2/2014 | Kludt et al. |
| 8,666,319 B2 | 3/2014 | Kloper et al. |
| 8,744,511 B2 | 6/2014 | Jones et al. |
| 8,767,862 B2 | 7/2014 | Abreu et al. |
| 8,774,150 B1 | 7/2014 | Jeffery et al. |
| 8,780,743 B2 | 7/2014 | Sombrutzki et al. |
| 2001/0029326 A1 | 10/2001 | Diab et al. |
| 2001/0038665 A1 | 11/2001 | Baltersee et al. |
| 2002/0024975 A1 | 2/2002 | Hendler |
| 2002/0051430 A1 | 5/2002 | Kasami et al. |
| 2002/0065107 A1 | 5/2002 | Harel et al. |
| 2002/0085643 A1 | 7/2002 | Kitchener et al. |
| 2002/0107013 A1 | 8/2002 | Fitzgerald |
| 2002/0115474 A1 | 8/2002 | Yoshino et al. |
| 2002/0181426 A1 | 12/2002 | Sherman |
| 2002/0181437 A1 | 12/2002 | Ohkubo et al. |
| 2003/0087645 A1 | 5/2003 | Kim et al. |
| 2003/0114162 A1 | 6/2003 | Chheda et al. |
| 2003/0153322 A1 | 8/2003 | Burke et al. |
| 2003/0153360 A1 | 8/2003 | Burke et al. |
| 2003/0186653 A1 | 10/2003 | Mohebbi et al. |
| 2003/0203717 A1 | 10/2003 | Chuprun et al. |
| 2003/0203743 A1 | 10/2003 | Sugar et al. |
| 2004/0023693 A1 | 2/2004 | Okawa et al. |
| 2004/0056795 A1 | 3/2004 | Ericson et al. |
| 2004/0063455 A1 | 4/2004 | Eran et al. |
| 2004/0081144 A1 | 4/2004 | Martin et al. |
| 2004/0121810 A1 | 6/2004 | Goransson et al. |
| 2004/0125899 A1 | 7/2004 | Li et al. |
| 2004/0125900 A1 | 7/2004 | Liu et al. |
| 2004/0142696 A1 | 7/2004 | Saunders et al. |
| 2004/0147266 A1 | 7/2004 | Hwang et al. |
| 2004/0156399 A1 | 8/2004 | Eran |
| 2004/0166902 A1 | 8/2004 | Castellano et al. |
| 2004/0198292 A1 | 10/2004 | Smith et al. |
| 2004/0228388 A1 | 11/2004 | Salmenkaita |
| 2004/0235527 A1 | 11/2004 | Reudink et al. |
| 2004/0264504 A1 | 12/2004 | Jin |
| 2005/0068230 A1 | 3/2005 | Munoz et al. |
| 2005/0068918 A1 | 3/2005 | Mantravadi et al. |
| 2005/0075140 A1 | 4/2005 | Famolari |
| 2005/0129155 A1 | 6/2005 | Hoshino |
| 2005/0147023 A1 | 7/2005 | Stephens et al. |
| 2005/0163097 A1 | 7/2005 | Do et al. |
| 2005/0245224 A1 | 11/2005 | Kurioka |
| 2005/0250544 A1 | 11/2005 | Grant et al. |
| 2005/0254513 A1 | 11/2005 | Cave et al. |
| 2005/0265436 A1 | 12/2005 | Suh et al. |
| 2005/0286440 A1 | 12/2005 | Strutt et al. |
| 2005/0287962 A1 | 12/2005 | Mehta et al. |
| 2006/0041676 A1 | 2/2006 | Sherman |
| 2006/0092889 A1 | 5/2006 | Lyons et al. |
| 2006/0094372 A1 | 5/2006 | Ahn et al. |
| 2006/0098605 A1 | 5/2006 | Li |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115882 A1 | 5/2007 | Wentink |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1 | 9/2007 | Gilbert et al. |
| 2007/0249386 A1 | 10/2007 | Bennett |
| 2008/0043867 A1 | 2/2008 | Blanz et al. |
| 2008/0051037 A1 | 2/2008 | Molnar et al. |
| 2008/0095163 A1 | 4/2008 | Chen et al. |
| 2008/0108352 A1 | 5/2008 | Montemurro et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |

(56) References Cited

U.S. PATENT DOCUMENTS

| | | |
|---|---|---|
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0111039 A1 | 5/2010 | Kim et al. |
| 2010/0117890 A1 | 5/2010 | Vook et al. |
| 2010/0135420 A1* | 6/2010 | Xu et al. .............. 375/260 |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1* | 8/2012 | Petersson et al. ............. 342/373 |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1 | 6/2013 | Debnath et al. |
| 2013/0156120 A1 | 6/2013 | Josiam et al. |
| 2013/0170388 A1 | 7/2013 | Ito et al. |
| 2013/0172029 A1 | 7/2013 | Chang et al. |
| 2013/0190006 A1 | 7/2013 | Kazmi et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |
| 2013/0242853 A1 | 9/2013 | Seo et al. |
| 2013/0242899 A1 | 9/2013 | Lysejko et al. |
| 2013/0242965 A1 | 9/2013 | Horn et al. |
| 2013/0242976 A1 | 9/2013 | Katayama et al. |
| 2013/0252621 A1 | 9/2013 | Dimou et al. |
| 2013/0272437 A1* | 10/2013 | Eidson et al. ................. 375/267 |
| 2013/0301551 A1 | 11/2013 | Ghosh et al. |
| 2013/0331136 A1 | 12/2013 | Yang et al. |
| 2013/0343369 A1 | 12/2013 | Yamaura |
| 2014/0010089 A1 | 1/2014 | Cai et al. |
| 2014/0010211 A1 | 1/2014 | Asterjadhi et al. |
| 2014/0029433 A1 | 1/2014 | Wentink |
| 2014/0071873 A1 | 3/2014 | Wang et al. |
| 2014/0086077 A1 | 3/2014 | Safavi |
| 2014/0086081 A1 | 3/2014 | Mack et al. |
| 2014/0098681 A1 | 4/2014 | Stager et al. |
| 2014/0119288 A1 | 5/2014 | Zhu et al. |
| 2014/0185501 A1 | 7/2014 | Park et al. |
| 2014/0185535 A1 | 7/2014 | Park et al. |
| 2014/0192820 A1 | 7/2014 | Azizi et al. |
| 2014/0204821 A1 | 7/2014 | Seok et al. |
| 2014/0241182 A1 | 8/2014 | Smadi |
| 2014/0307653 A1 | 10/2014 | Liu et al. |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

(56) References Cited

FOREIGN PATENT DOCUMENTS

OTHER PUBLICATIONS

U.S. Appl. No. 13/925,454, filed Jun. 24, 2013, Jeffery, et al.
U.S. Appl. No. 14/042,020, filed Sep. 30, 2013, Jeffery, et al.
U.S. Appl. No. 14/273,866, filed May 9, 2014, Rivingston, et al.
Office Action issued by the United States Patent and Trademark Office for U.S. Appl. No. 13/630,146 dated Jan. 22, 2013.
Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.

(56) References Cited

OTHER PUBLICATIONS

Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 14/250,767 dated Dec. 26, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, No. Ljubljana; 20090107, Jan. 7, 2009, pp. 1-4.
Alcatel-Lucent Shanghai Bell et al., "Antenna Array Calibration for TDD CoMP", 3GPP Draft; R1-100427, $3^{rd}$ Generation Partnership Project (3GPP), Mobile Competence Centre; 650, Route Des Lucioles; F06921 Sophia-Antipolis Cedex; France, vol. RAN WG1, No. Valencia, Spain; 20100118, Jan. 12, 2010, pp. 1-5.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference on, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.

* cited by examiner

MULTIPLE CO-LOCATED MULTI-USER-MIMO ACCESS POINTS

FIELD OF THE PRESENT INVENTION

The present invention relates generally to the field of radio frequency (RF) multiple-input-multiple-output (MIMO) systems and in particular to systems and methods for enhanced performance of RF MIMO systems using RF beamforming and/or digital signal processing.

BACKGROUND

Wi-Fi may be implemented with a limited amount of frequency resources that use techniques of collision avoidance to allow multiple user equipments (UE's) to share the same channel. As the numbers of UE's increase, the impact of collision avoidance restricts the ability of co-located Cellular Base Stations (BTS) or Wi-Fi access points (AP) to support many users without impacting the performance to and from each UE. Co-located AP's, otherwise known as multi-beam access points (MBAP's), may include a group of AP's with the ability to serve different UE's on the same frequency using directive signal beamformers with multi-beam antennas. However, several limitations of Wi-Fi multi-beam antennas may need to be addressed in order to provide signals to multiple UE's on the same frequency. First, since WiFi is a time division multiplex system (TDD), the transmitting and receiving functions may use the same channel. Unsynchronized operation between APs means a transmitting AP's signal may interfere with the reception of another AP that uses the same channel unless sufficient isolation (e.g., 125 dB) is provided between the transmitting and receiving functions.

Some solutions for providing sufficient isolation may involve using physically separated antenna arrays for transmit and receive functions. Other solutions may provide cancellation of each transmitted signal within the receiver processing functions. Another limitation of multi-beam antennas is that they may not offer complete separation of coverage from one beam to other adjacent beams. Systems and methods may be needed to mitigate the performance effects of overlapping beams of adjacent antennas. In addition to overlapping beams, sidelobe radiation from a beam may introduce extraneous radiation in other beams, causing further interference.

SUMMARY

A wireless communication system may include a plurality of N co-located Wi-Fi access points, each configured to communicate with at least one user equipment. The system may further include a beamformer coupled to each of the access points and coupled to at least one antenna array. The antenna array may include a plurality of antenna elements and may be configured to provide a plurality of M spatially uncorrelated beams for a coverage area of each of the N access points.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
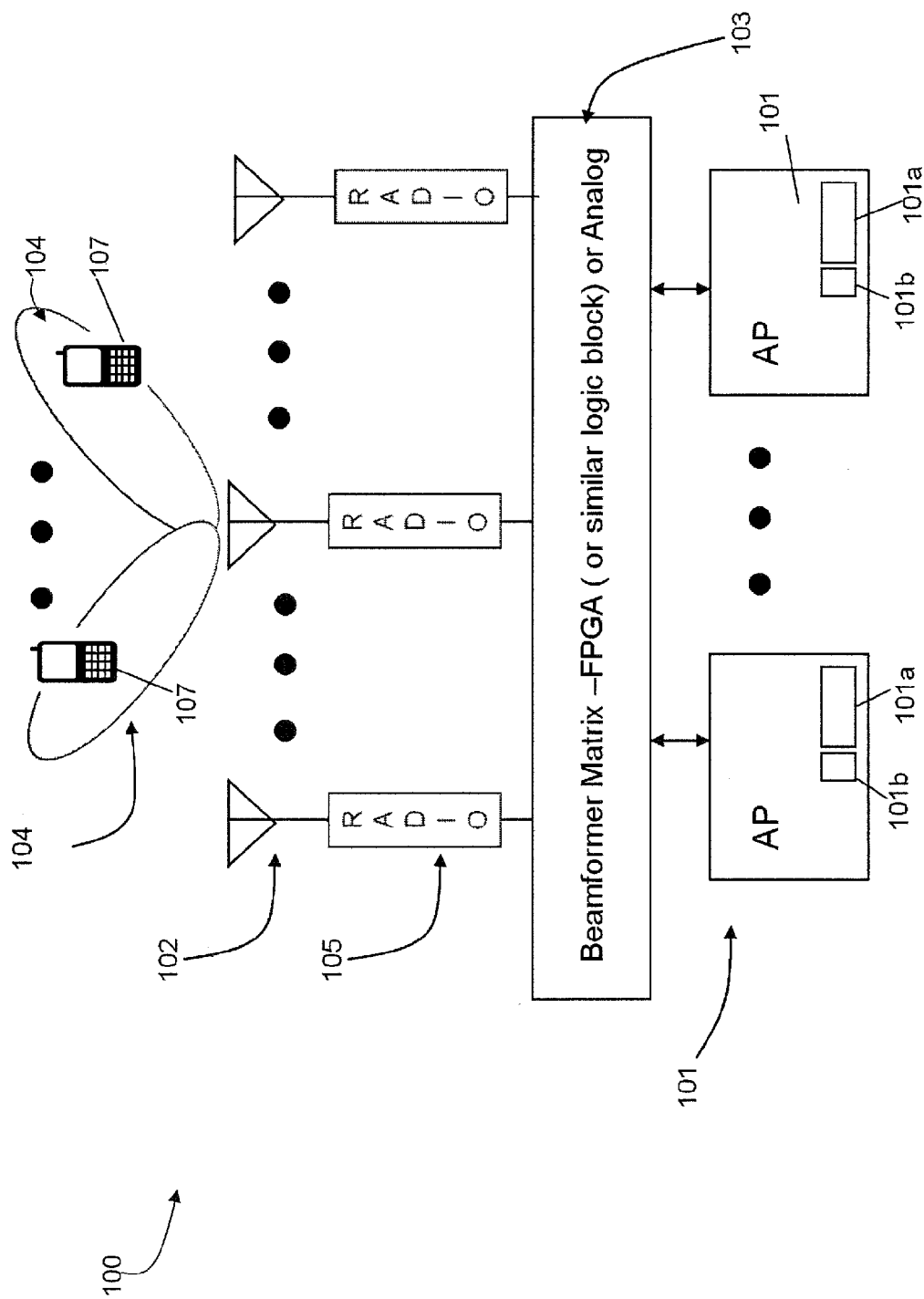
FIG. 1 is a schematic of a multi-beam access point system, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Prior to setting forth a short discussion of the related art, it may be helpful to set forth definitions of certain terms that will be used hereinafter.

The term "AP" is an acronym for Access Point and is used herein to define a WiFi station that is an attachment point for UE.

The term "UE" is an acronym for User Equipment and is used herein to define the WiFi station that attaches to an AP.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term MBAP is an acronym for multi-beam access point. A MBAP may include multiple AP operating simultaneously on the same radio channel where directive beams and other technology enable the operation of co-located AP's.

The term "SU MIMO" is an acronym for Single User Multiple Input Multiple Output and is used herein to define a technique to establish multiple spatial streams between a single Access Point (AP) and a single UE (User Equipment) so as to improve the spectral efficiency (more bits per second per Hz of bandwidth) or to achieve a diversity gain that improves the link reliability (reduced fading), or increased antenna directivity.

The term "MU MIMO" is an acronym for Multi User Multiple Input Multiple Output and is used herein to define a technique to establish multiple spatial streams e.g. MU_MIMO 802.11 ac protocol.

The term "uncorrelated" as used herein refers to the statistical independence of the RF environment as intercepted by different antennas so as to be able to support independent radio streams. A correlation value of 0.0 means there is no statistical dependence between the antennas, while a correlation value of 1.0 means there a statistical relationship between the antennas. For example, a correlation value of 0.3 or less may support two independent RF streams as required by SU or MU MIMO and may referred to as "uncorrelated".

The term "beamformer" as used herein refers to RF and/or digital circuitry that implements beamforming and includes combiners and phase shifters or delays and in some cases amplifiers and/or attenuators to adjust the weights of signals to or from each antenna in an antenna array. Digital beamformers may be implemented in digital circuitry such as a digital signal processor (DSP), field-programmable gate array (FPGA), microprocessors or the CPU of a computer to set the weights (phases and amplitudes) of the above signals. Various techniques may be used to implement beamforming including a Butler matrix, Blass Matrix and Rotman Lens. In general, most approaches may attempt to provide simultaneous coverage within a sector using multiple beams.

The term Base Band Processor (BBP) as used herein refers to a processor for encoding data and decoding data so as to create the required WiFi baseband signal for all versions of the 802.11 protocol. Each access point may include a BBP to communicate with UE's.

Embodiments of the invention may be described in reference to the IEEE (Institute of Electrical and Electronics Engineer) 802.11 standard for implementing wireless local area networks (WLAN). The IEEE 802.11 standard may also be known as the Wi-Fi standard. "802.11xx" may refer to any version of the 802.11 standard, such as 802.11a, 802.11g, or 802.11ac, for example. Versions of the 802.11 standard may operate using a technique called Collision Sense Multiple Access/Collision Avoidance (CSMA/CA), a networking method which aims to prevent transmission collisions before they occur. While embodiments of the invention are described in terms of the 802.11 protocol, other network protocols built on the CSMA/CA concept may be used. Access points (AP's) using a CSMA/CA wireless network, including IEEE 802.11 WiFi networks, may determine whether a radio channel is clear, prior to broadcasting or transmitting data in the channel. The AP may do this by performing a clear channel assessment (CCA), which includes two functions: listening to received energy on an RF interface (termed "energy detection"), or detecting and decoding an incoming Wi-Fi signal preamble from a nearby AP.

According to embodiments of the invention, a MBAP, which may act as a Wi-Fi base station, may include a cluster or plurality of co-located Wi-Fi access points, each access point with independent transmit and receive capabilities. Each access point may use directive antennas to focus the radio energy on an azimuth covering an intended user on a user equipment (UE), enabling one or the same radio frequency or frequency channel (e.g., the same or overlapping frequency spectrum) to be used simultaneously or concurrently on a different azimuth beam which points to a different UE. Access points may be co-located if, under ordinary usage of the CSMA/CA technique, data transmission from one transceiver prevents simultaneous data transmission from another transceiver on the same channel or frequency. The transceivers' co-location or proximity to each other may cause, for example, RF interference or a busy CCA signal.

The coverage of a MBAP may be termed a sector. In order to provide continuous coverage throughout a sector, the coverage of adjacent beams of a multi-beam antenna may overlap. This may present a potential for interference when adjacent beams illuminate the same area on the same frequency. To mitigate against interference, different channels for adjacent beams may be used to reduce the interference from one subsector beam to another. Even so, the possibility may still exists that UE's in the region where beams overlap may register with an AP/frequency that is assigned to a beam that does not provide the best coverage for the UE. This may happen because UE's may inspect a channel and stop searching after they detect the first AP that satisfies their registration needs. This can also happen as a UE moves from one beam to the next, commonly referred to as "roaming" The issue is more severe for UE's nearer to a MBAP, because those UE's may traverse each AP's beams more quickly and because registration in the "wrong" beam is more likely due to their proximity to the antennas and detection of stronger signals from more beams. Embodiments of the invention may provide a method that detects such cases and provides the means to assign the UE to a more suitable serving AP.

Another limitation of non-ideal beam directivity is sidelobe radiation. Sidelobes (SL) introduce radiation in directions other than the directions intended to be covered by the beam. This sidelobe radiation can produce a source of interference to those directions when transmitting in those other directions. When receiving a UE within a beam, the sidelobes may also receive energy from UE's that are not within the beam. Various techniques may employed to reduce the sidelobe interference, the most common being tapering the gain of the antenna elements differently depending on their position in the antenna array. Typically, the gain of antenna elements may be lower as the antenna position is further from the center of an MBAP. Such gain tapering may be described by Taylor weighting, for example. A limitation of tapering is that acceptable performance requires antenna arrays with a fairly large number of antenna elements. Embodiments of the invention may provide methods to produce usable directivity with a four-element array, instead of relying on a larger-element array with tapering.

Embodiments of the invention described herein may be for a SU and/or MU MIMO scheme, such as four-stream MBAP, where a plurality of streams are transmitted or received for each access point. To support a four-stream MBAP, for example, one or more antenna arrays may be required to generate four spatially uncorrelated beams for each coverage area that is provided by each of the co-located access points in a MBAP. In another example, a two-stream MBAP may be required to generate two spatially uncorrelated beams for each coverage area provided by each of the co-located access points. Spatial uncorrelation may mean a configuration where beams are uncorrelated for purposes of a MIMO scheme, and the uncorrelation may be achieved through spatial or physical separation of antenna arrays. The following sections will first describe the implementation of a single antenna for each coverage area, followed by a description of how the single antenna may be expanded to produce four uncorrelated antenna for each coverage area.

FIG. 1 is a block diagram of a multi-beam access point, according to embodiments of the invention. A multi-beam access point 100 may include a plurality or a number of access points 101 that are each configured to communicate with at least one UE 107. The communication with UE may be in a data format compliant with versions of the IEEE 802.11 standard. The access points 101 may be coupled to a beamformer 103 and antenna array 102 to create a number of beams 104 to form a multi-beam access point system using phased array technology. Each beam 104 may be capable of serving (e.g., transmitting signals to and receiving signals from) a UE 107. As used herein, beams 104 may refer to both transmitting beams and receiving beams that are used or provided by each access point 101. Each beams' 104 transmitting beams and receiving beams (not shown here) may be described in more detail in FIGS. 3 and 8-10, for example. UE's 107 may be a cell phone, smart phone, tablet or any device with Wi-Fi capability and able to communicate with a Wi-Fi access point, or another wireless capable device. Access points 101 may each operate according to the IEEE 802.11 protocol, or other protocol using CSMA/CA, and may each include a processor 101a and memory 101b. Processors 101a may be a general purpose processor configured to perform embodiments of the invention by for example executing code or software stored in memory 101b, or may be other processors, e.g. a dedicated processor, such as a baseband processor.

If the beamformer 103 is implemented digitally, the beamformer may be a FPGA (field-programmable gate array), a configurable integrated circuit. When transmitting signals to UE's 107, the output from the AP into the FPGA may be in digital format and the output from the FPGA may be converted to analog signals in the radios 105, up-converted and then radiated in antennas 102 to create radiated beams 104. For receiving signals from UE's 107, the process may be reversed. Signals received on beams 104 to antennas 102 may be amplified, down-converted and digitized in the radios 105. The digitized IF (intermediate frequency) may then be processed in the FPGA 103 to isolate the individual received beam signals and subsequently routed to the appropriate AP 101.

If the beamformer 103 is implemented in analog, the output from the AP may be analog for input to the beamformer 103 and all further signal processing is done in the analog domain. For receiving signals, the process is reversed. Signals received on beams 104 to antennas 102 may be amplified, then down-converted in the radios 105. The analog IF may then be processed in the analog beamformer 103 to isolate the individual received beam signals and routed to the appropriate AP 101. Beamforming may also be implemented in other configurations.

Figure 2:
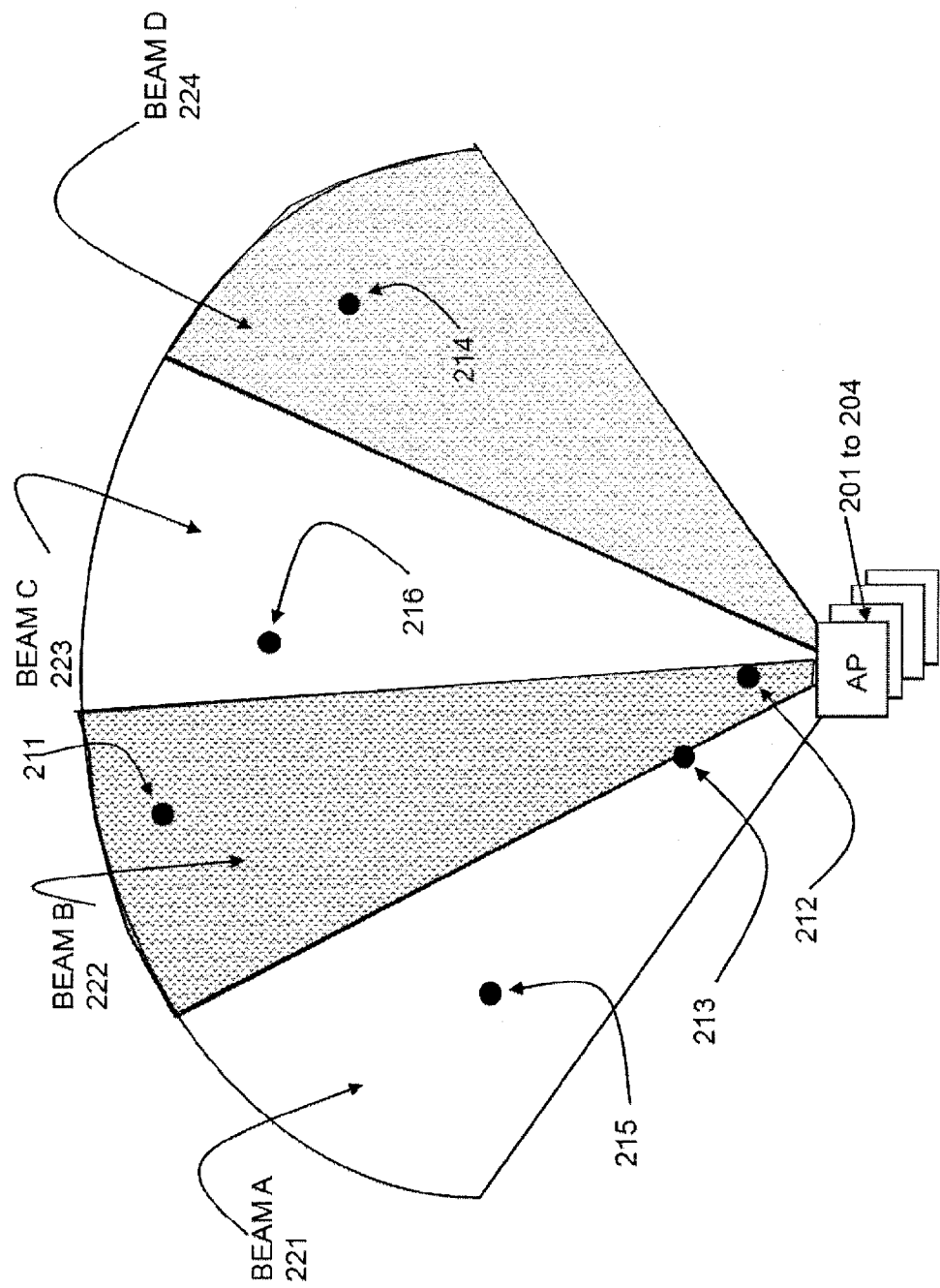
FIG. 2 is a diagram of sector coverage by a multi-beam access point system, according to embodiments of the invention.

Although either digital or analog beamforming can be implemented as described above, implementing the beamformer in FPGA may result in improved cross talk over implementing the beamformer in an analog manner. A digital approach may provide more control in electrically tilting the antennas and may provide the ability of applying tailoring (or other forms of tapering) after the electrical tilting has been applied. Electrical tilting may involve adjusting the phase between antenna elements of an antenna array to adjust the directionality of a beam. While this technique may also be possible with an analog beamformer, greater precision and control may be achieved with a FPGA. The ability to apply electrical tilting may enable the antenna array to be three dimensional, where beam patterns may be controlled in the vertical dimension as well as the horizontal dimension FIG. 2 is a diagram of a multi-beam access point's beam coverage area, according to embodiments of the invention. A multi-beam access point may include four co-located AP's 201-204 which provides coverage in four sub-sectors, each sub-sector served by a beam transmitted or received by AP's 201-204. Each beam may provide communication for access points 201 to 204 to one or more UEs 211 through 216. For example, Beam C 223 may provide communication between AP 203 and UE 216 as shown. In another example, Beam B may provide coverage between AP 202 and UE's 211 and 212. Beam B may also provide coverage to UE 213 according to some embodiments of the invention if it is efficient and practical to do so. As further explained below, embodiments of the invention may include one or more antenna arrays which provide a plurality of spatially uncorrelated beams for a coverage area of each of the access points. The plurality of spatially uncorrelated beams may be provided in accordance with MIMO Wi-Fi protocols, for example.

Figure 3:
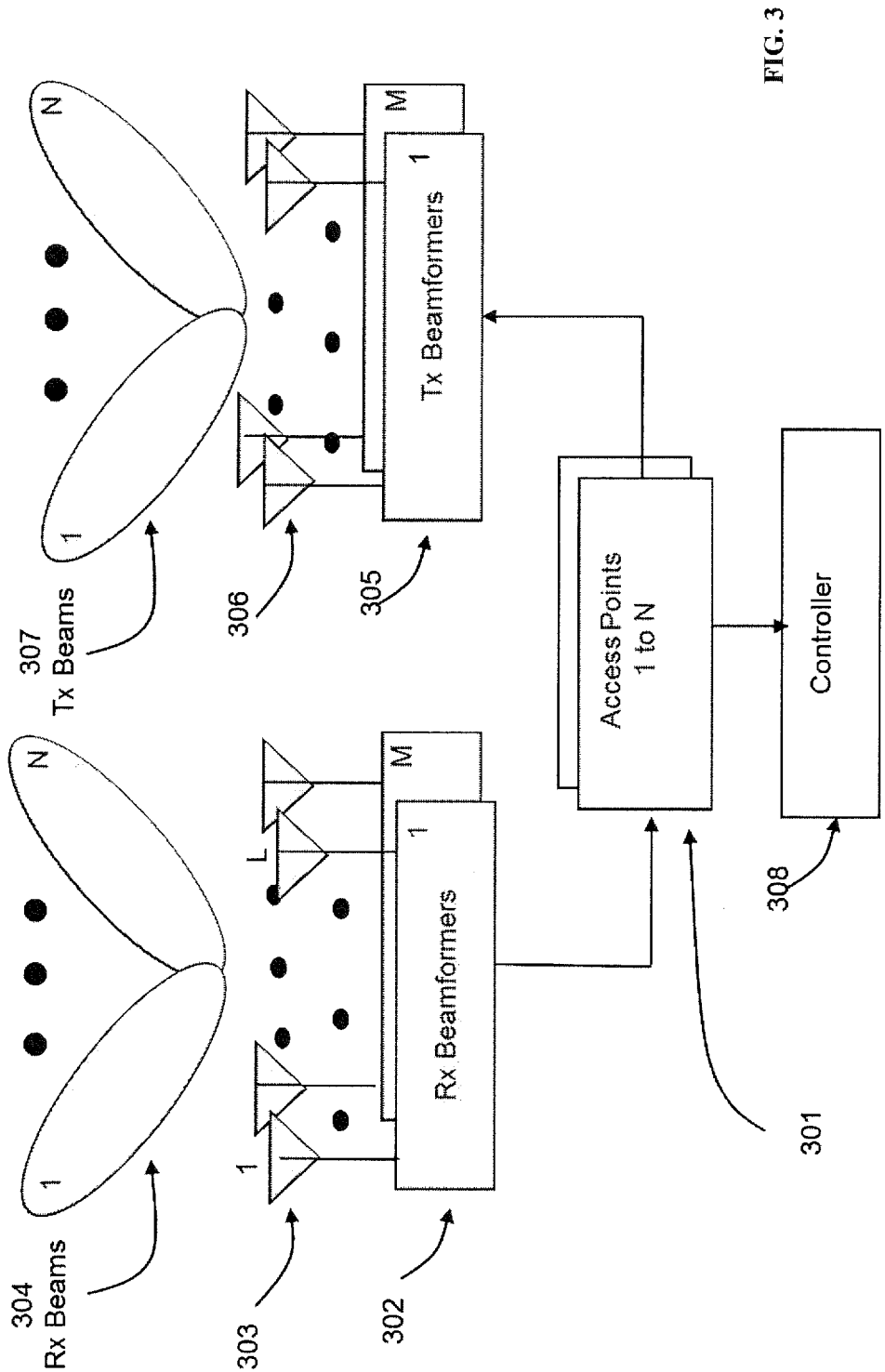
FIG. 3 is a schematic of a multi-beam access point using a in some embodiments of the invention.

FIG. 3 is a schematic of a multi-beam access point with separated transmit and receive functions. As described above, since Wi-Fi employs a TDD protocol, the same frequency resources may be used for transmit and receive functions. Normally, this may not be a problem because a single isolated access point may never transmit and receive at the same time. However, in a multi-beam system as described, one access point may be transmitting while another is receiving. Transmitted signals from one AP may be coupled to the receiving circuits of another and create interference to the receiving AP. Such coupling may be due to inadequate isolation between transmit and receive circuits and signal return attenuation due to antenna mismatches.

In a system with separated transmit and receive functions, a multi-beam access point may include a plurality of N access points 301 to generate transmit signals to N beamformers 305 which drive a plurality of M transmitting antenna arrays 306. Each transmitting antenna array 306 may have up to L separate antenna elements. Each of the M transmitting antenna arrays 306 may be positioned so that the transmitting antenna arrays 306 each produce N antenna azimuth beams 307 that are uncorrelated from each of the other azimuth beams 307 produced by other transmitting antenna arrays 306. This uncorrelation may be achieved by physical separation between each of the transmitting antenna arrays of nominally 0.5 wavelength, or more, or by orthogonally polarized antenna feeds. The effect of this may be to produce a total of N×M beams which may each be uncorrelated from each other.

For receiving data from UE's, the operation is reversed. A plurality or number N of receive beams 304 are created by M receiving antenna arrays 303, each of which may have up to L separate antenna elements. As with the transmitter antenna structure described above, each of the M receiving antenna arrays 303 is designed to have uncorrelated receiving beams for each AP 301, by reporting received signal parameters to a controller 308. Thus, the receiving antenna arrays may provide a plurality of M spatially uncorrelated receiving beams for each area served by each access point 301.

The antenna arrays that comprise the arrays labeled "1 . . . N" in 307 and in 304 may be configured to operate adaptively in order to optimize spatial separation obtained by segmenting the transmit and receive beams in the horizontal dimensions (e.g., the plane of the coverage area). The transmitting and receiving antenna arrays arrays labeled "1 . . . M" in 306 and 303 may each be physically separated by at least 0.5 wavelengths or more so as to create effective antennas that are uncorrelated with each other. In general, MIMO operation requires the number of uncorrelated beams must be equal to or less than the number of antenna elements L in each array. The maximum number of beams that can be produced from a beamformer with L antenna element inputs/outputs is N where N<=L.

As described above, there are M antenna arrays which each provide N transmitting or receiving beams (depending on the respective transmitting or receiving array), one beam for each of the coverage areas served by each of the N access points. In practice, alternating radio channels across the access points may be used, so that the effective maximal frequency reutilization factor of the MBAP may be N/2×M simultaneous co-frequency streams. Implementation may be performed with either analog or digital beamformers as described in FIG. 1, but digital beamforming may enable the arrays' vertical beam pattern to be more precisely adjusted.

Figure 4:
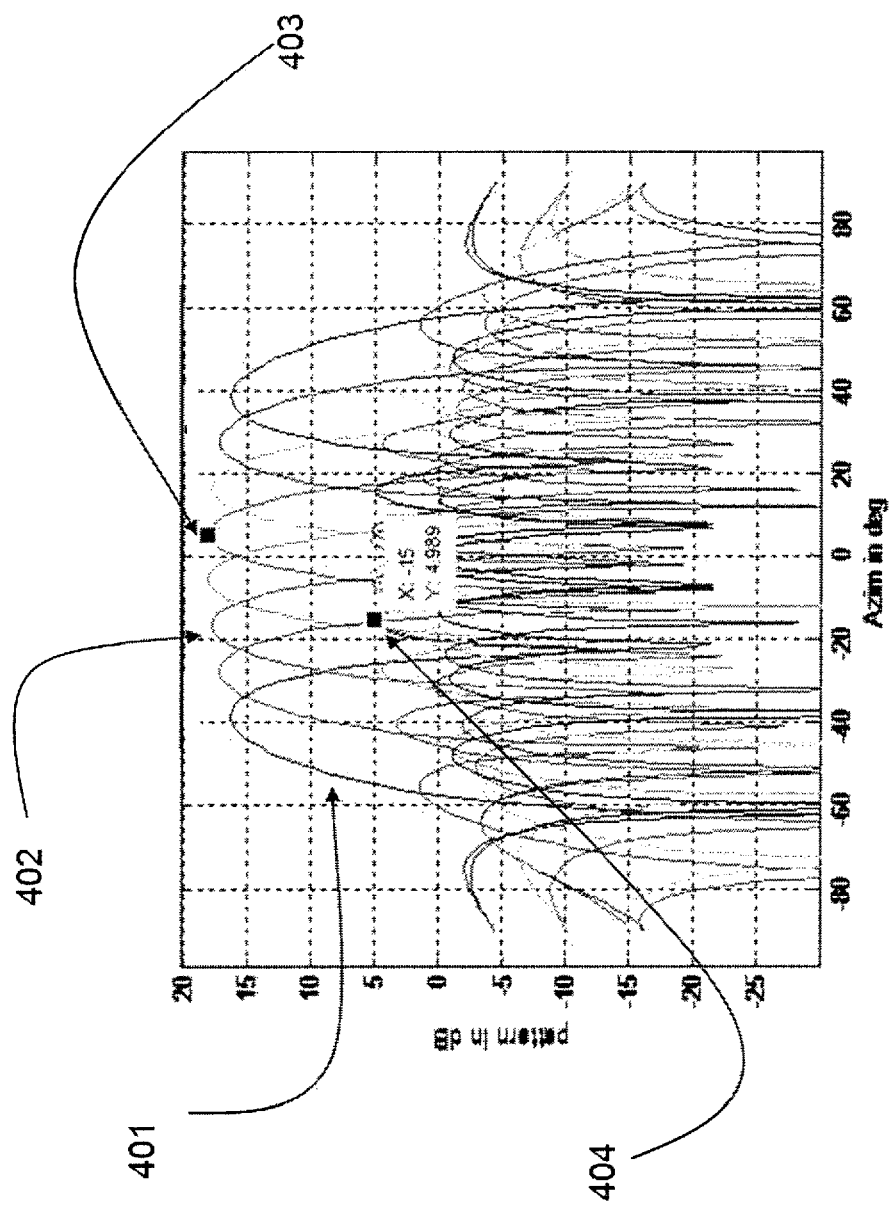
FIG. 4 is a schematic illustration of a radiation pattern of a multi-beam system in accordance with embodiments of the invention.

FIG. 4 is a radiation pattern for an eight element, eight beam array, according to embodiments of the invention. The array may use standard (e.g., Butler) beamforming techniques. The eight beams may be divided into alternate clusters where each cluster operates on the same radio channel. For example, beam 401 and 402 and 403 will operate on the same radio channel. Each beam has a set of side which can be reduced by tapering. In the figure that the ratio of beam peaks 403 to the first sidelobe peak 404 is approximately 13 dB, which may be achieved by tapering (e.g., Taylor weighted). Tapering and other techniques can be used to reduce the further out sidelobes to more than 25 dB. Other weighing can be used.

Figure 5A:
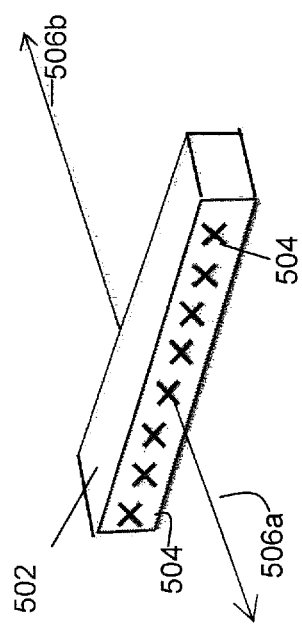
FIGS. 5A and 5B are diagrams of dual polarized antenna arrays, according to embodiments of the invention.
Figure 5B:
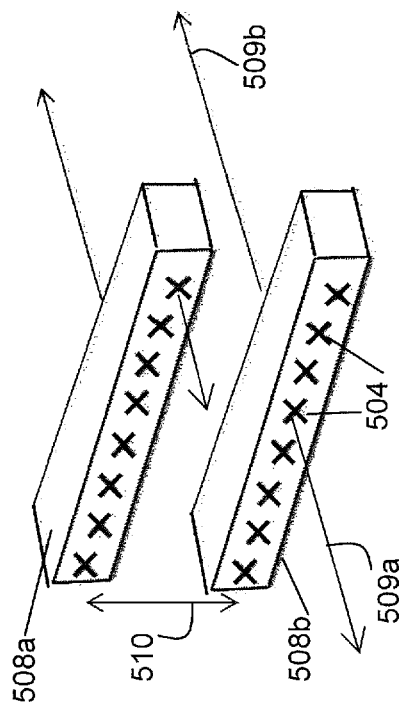

FIGS. 5A and 5B are diagrams of dual polarized antenna arrays, according to embodiments of the invention. As was previously stated, a SU-MU-MIMO array for 802.11AC four stream MBAP requires four spatially uncorrelated beams. Four uncorrelated beams may be accomplished by using a combination of cross polarized antenna elements in the array and by including a separate, physically separated array. This concept may apply for both transmitting and receiving antenna arrays. In FIG. 5A, an antenna array 502 may include eight cross dipole antenna elements 504 mounted to produce +45° linear polarization in one direction 506a and −45° linear polarization in another direction 506b. Total, there may be sixteen antenna element outputs L from the antenna array 502, e.g, eight +45° and eight −45°. In this configuration, the antenna array 502 may provide M=2 spatially uncorrelated beams for a coverage area of each of the access points that feed data into (or receive data from) the antenna array 502. Antenna array 502 may produce N≤L, or N≤8 in this case, uncorrelated beams, one for each coverage area of the N access points. In FIG. 5B, antenna element outputs may be doubled with two antenna arrays 508a and 508b mounted above each other, with a spacing 510 of about 0.7 lambda (or wavelength). At minimum, the two antenna arrays 508a and 508b may be separated by 0.5 times wavelength. Each of the antenna arrays 508a and 508b may include eight cross dipole antenna elements 504, with each antenna element 504 producing +45° linear polarization in one direction 509a and −45° linear polarization in another direction 509b. Thus, there may be 32 outputs from the two antenna arrays 508a and 508b. FIG. 5b is but one possible configuration of these two arrays. Other arrangements include, but are not limited to different types of cross polarization, different number of antenna elements in each array and array mounting side by side or at different spacing.

Figure 6:
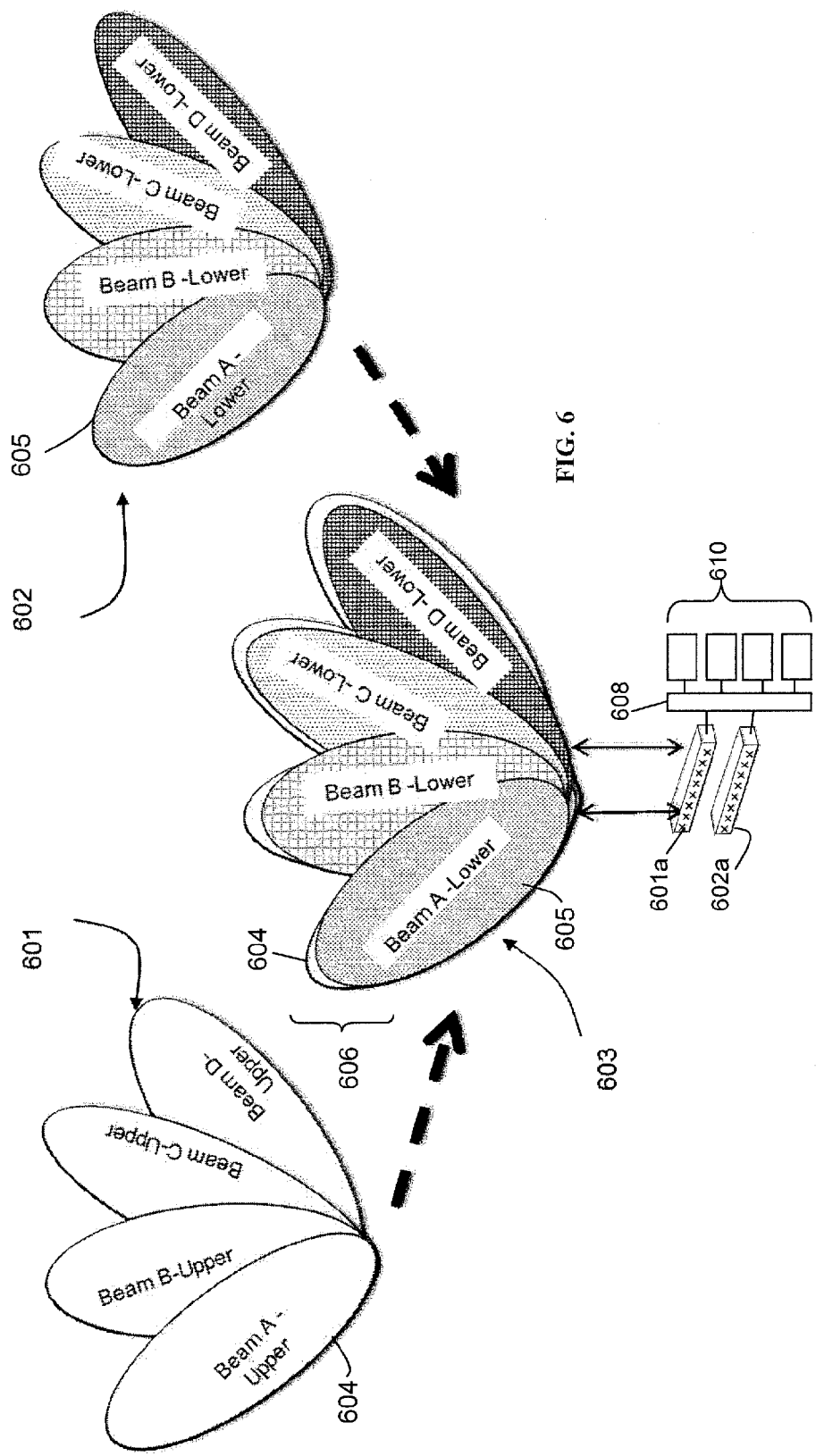
FIG. 6 is an illustration of antenna patterns for two antenna arrays on a multi-beam access point, according to embodiments of the invention.

FIG. 6 is an illustration of antenna patterns for two antenna arrays on a multi-beam access point, according to embodiments of the invention. In an antenna array configuration using two antenna arrays including an upper array 601a and a lower array 602a, such as the one illustrated in FIG. 5b, the beam pattern from the upper array 601 and the beam pattern from the lower array 602 are both aligned such that each respective beam in each coverage area covers the same azimuth sector 603. For example, Beam A 604 from the upper array 601a and Beam A 605 from the lower array 602a may be arranged to cover the same azimuth sector for Beam A 606 in the combined antenna array configuration. The outputs 604 from the antenna arrays 601a and 602a and the beamformer 608 coupled to four AP's 610 may be four sector beams (Beam A, Beam B, Beam C and Beam D), with each beam including two spatially uncorrelated beams (e.g., one from the upper antenna array, and one from the lower antenna array). This configuration of two antenna arrays, with single polarized antenna array elements, may provide M=2 spatially uncorrelated beams for each coverage area (e.g., Beam A, Beam B, Beam C, Beam D). In another embodiment, with two physical antenna arrays as shown, each having dual polarization, the two-array configuration may provide an effective M=4 spatially uncorrelated beams for each coverage area as described in FIG. 3.

An alternate, albeit physically larger, implementation of an array may have four uncorrelated antenna outputs for each beam. For example, the antenna configuration may include four arrays (instead of two arrays as illustrated in FIGS. 6 and 5b), stacked above each other. The four arrays may be aligned similarly to the two arrays in FIGS. 6 and 5b so that respective beams cover the same azimuth sector, yet are uncorrelated outputs. In this configuration, antenna polarization diversity may not be required and in some configurations may produce more robust uncorrelated channels. For four physical arrays, if only a single polarization antenna element output is considered, the array may have an effective M=4 as described in FIG. 3. In the same physical space, dual polarization may be used, and the four antenna array configuration may have an effective M=8.

In order to support the maximum capability for WiFi, modulation of 64-QAM may be required. This means the system should provide at least a −20 dB sidelobe ratio in order to achieve acceptable performance. As described above, antenna element tapering (e.g., Taylor weighting) may meet this requirement. However, even with −20 dB sidelobes, when a UE is close to an AP, the UE may be detected on the sidelobes of adjacent beams. UEs that are detected on multiple directive beams may be assigned to a sector beam which is a cluster beam that covers sidelobes and may be less directive than the primary directive beams.

Figure 7:
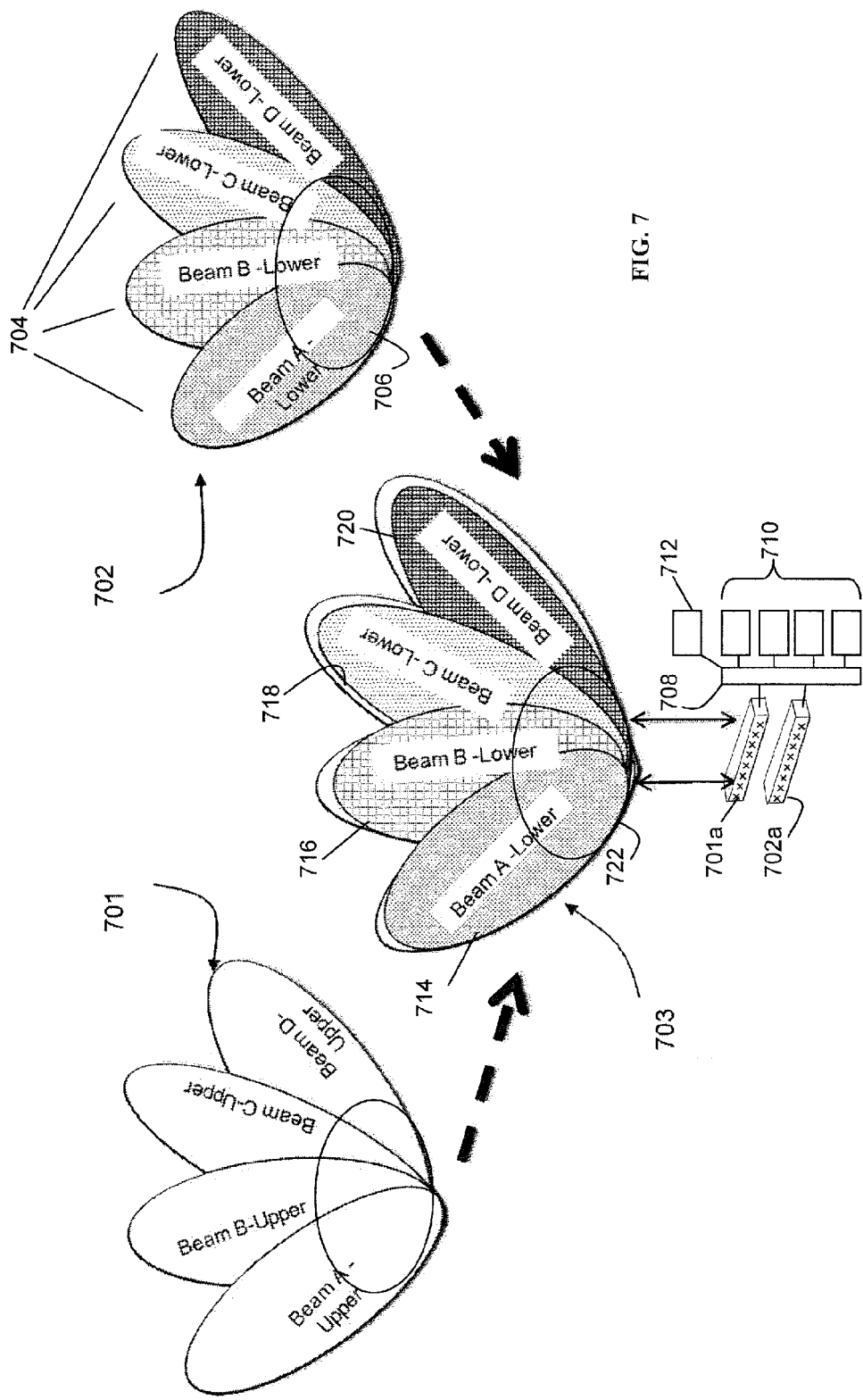
FIG. 7 is an illustration of antenna patterns for a multi-beam access point using a cluster beam covering sidelobes, according to embodiments of the invention.

FIG. 7 is an illustration of antenna patterns for a multi-beam access point using a cluster beam covering sidelobes, according to embodiments of the invention. An antenna array configuration may include an upper array 701a and a lower array 702a. The beam pattern for the upper array 701 and the beam pattern for the lower array 702 may include four directive beams 704 and a cluster beam 706 to cover when a UE is detected on the sidelobes of adjacent directive beams. The beam patterns from the upper 701a and lower array 702a may be aligned such that each respective beam covers the same azimuth sector 703. The outputs from the antenna arrays 701a and 702a and a beamformer 708 coupled to four AP's 710 and a cluster AP 712 may be a total of five sector beams (Beam A 714, Beam B 716, Beam C 718, Beam D 720, and cluster beam 722), with each beam including two uncorrelated antenna outputs (e.g., one from the upper antenna array, and one from the lower antenna array).

Figure 8:
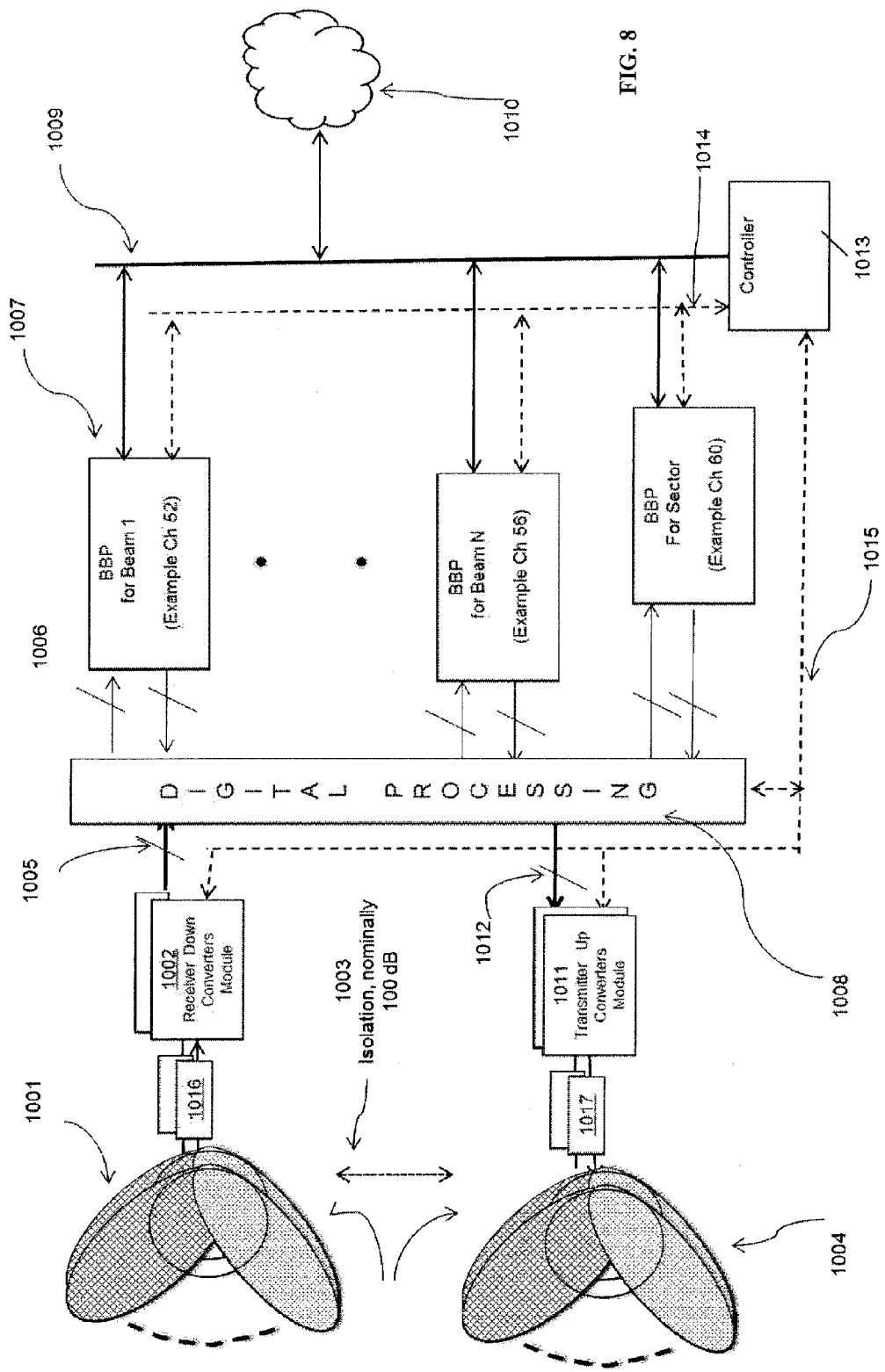
FIG. 8 illustrates the components for a SU-MU-Array assembled that uses an analog beamformer, according to embodiments of the invention.
Figure 10:
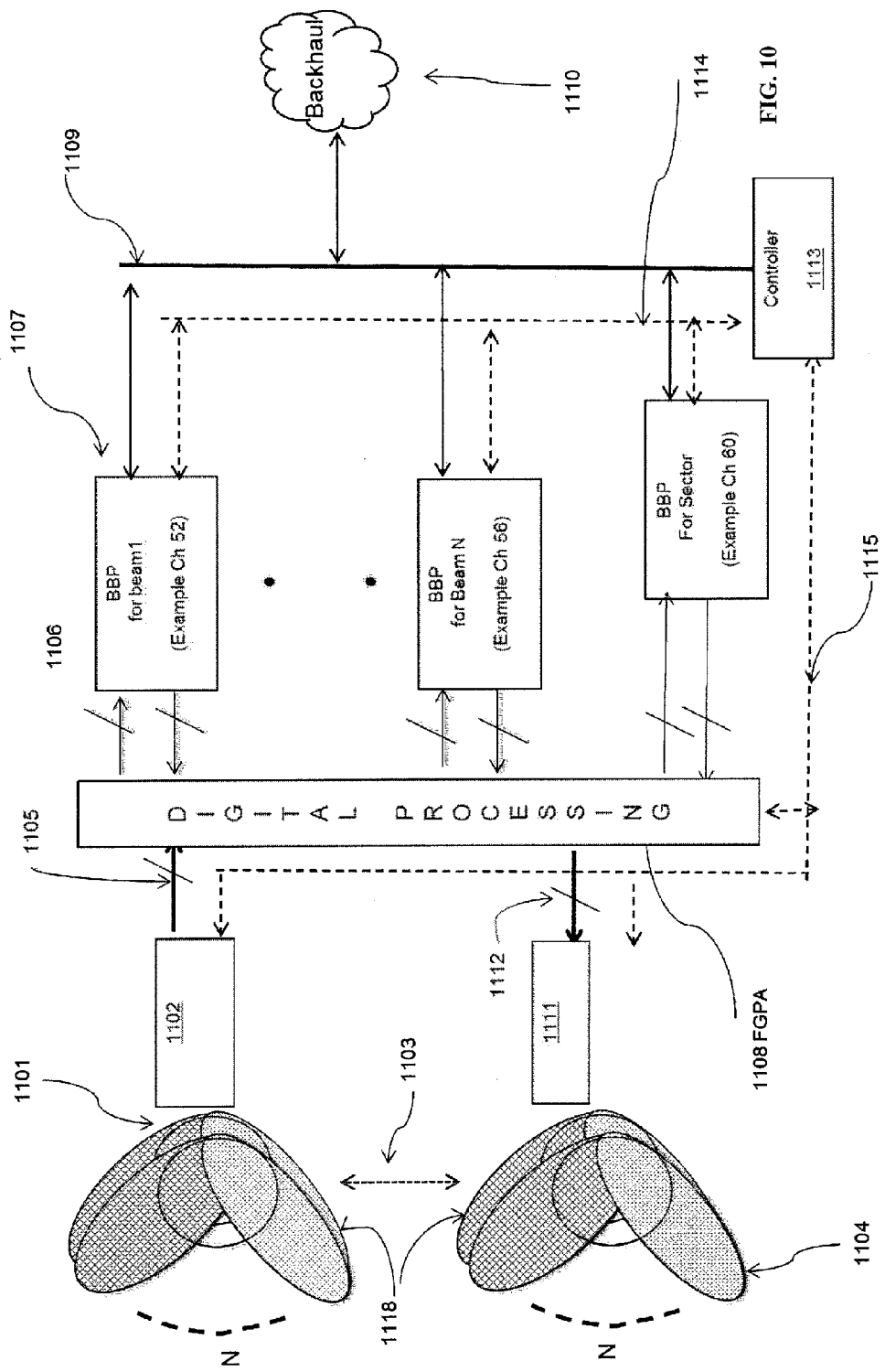
FIG. 10 illustrates the components for a SU-MU-Array assembled that uses a digital-only beamformer, according to embodiments of the invention.

FIGS. 8 and 10 illustrate two ways of implementing an MBAP that supports MU-SU-MIMO, according to embodiments of the invention. MIMO requires M uncorrelated antennas for each data stream and the design shown described how up to M=8 can be supported. FIG. 8 illustrates an MBAP implemented using analog 1-D (1-dimensional) beamforming while FIG. 10 shows a digital implementation that can support either 1-D or 2-D beamforming Hybrid approaches that combine features from FIGS. 8 and 10 may also be implemented.

The MBAP described herein can support all of the widely deployed versions of 802.11 even though not all of the supported version can support MIMO. For example, 802.11 a,b and g can support only 1 antenna input (M=1); 802.11n can support up to 2 antenna input (M=2); and 802.11AC can support up to 8 antenna inputs (M=8), but more typically 4 antenna inputs (M=4). The MBAP controller will dynamically configure the antenna structure as appropriate to the specific 802.11 version in use.

FIG. 8 illustrates the components for a SU-MU-Array that uses analog beamforming networks 1016 and 1017, according to embodiments of the invention. The receiving antenna array 1001 may consist of multiple antenna arrays similar to the array shown in FIG. 3. Shown are 1 to M arrays, each of which has an analog 1D beamformer with N outputs each. Each of these N beams is aligned on a different left and right azimuth (in 1D) and may be a beam that is uncorrelated from the other beams, resulting in N uncorrelated antennas from each antenna array. If the antenna elements are a dual polarized (typically linear at +45° and −45°), each polarization may also be uncorrelated, enabling each array to produce 2×N correlated outputs. Alternately arrays may be vertically stacked as shown in FIG. 6 and FIG. 7, with or without using cross polarization to achieve M, where M=1 to 8 uncorrelated antenna outputs.

These analog beamforming network outputs 1016 are input to the Receiver Down Converter Module 1002. The output 1005 from the Receiver Down Converter Module 1002 may be input to the FPGA 1008 where various digital cancellation and other processing may be applied. These other processing functions may include channel estimation, enhanced antenna side lobe cancellation and enhanced nulling of the associated transmitter signal using data provided to the controller 1014 and 1013. Physical separation of the between the Receiver Antenna Array 1001 and the Transmitter Antenna Array 1004 and careful design may result in a substantial portion of the required 100 dB isolation 1003 being achieved, while enhanced nulling may achieve the required remainder.

The output from the FPGA may be input to the BaseBand Processor (BBP) 1007 of an access point (not shown). There may be M×(N+1) total outputs, indicating the number of N antenna beams, the plus 1 is for the sector antenna and M is the number of MIMO streams being supported. Thus the BBP count may be N (one for each beam) plus 1 (for the sector or cluster antenna). Each of the BBP receivers requires 1 to M uncorrelated antenna inputs 1006, which are provided by the 1 to M vertically stacked arrays.

In another embodiment the M sets of adaptive analog 1D BFNs 1016 and 1017 may each be replaced by a single adaptive analog 2D BFN. The number of antenna elements is L, so each of the two 2D BFN (receiver and transmitter) may have L inputs and N times M outputs, one for each of the N beams and one for each of the M stacked arrays. The adaptive features enable adjustments of the beams in both the horizontal plane (e.g., the azimuth sector plane) and the vertical plane (e.g., up and down, perpendicular to the horizontal plane).

The digital processing function may be performed in the controller/database module 1013. Functions performed in the controller include coordination of signal flow between various BBP and may included tasking control and supplemental processing to support the digital processing 1008.

The output from the N+1 BBP is input to the internet backbone 1009 and routed to the Internet or Intranet Backhaul 1010, depending on the deployment.

For transmitting, the transmitting antenna array 1004 may accept the output from the Transmitter Up Converter Module 1011. The Transmitter Up Converter Module 1011 may include the functions of beamforming, up-converting the baseband to the radio band, and amplifying the signal. The input to the Transmitter Up Converter 1012 are from the N+1 BBP. Each BBP may produce up to M transmitter outputs which are input to the FPGA 1008 where various digital processing may occur, including pre-distortion to offset impairments detected by the receiver channel estimation block, enhanced antenna side lobe cancellation and input to the nulling of the associated transmitter signal.

The controller interfaces with the BBP 1014, the digital processor 1008, the Transmitter Up Converter 1011 and the Receiver Down Converters 1015.

The operation to discover a co-located AP operating on the same channel may be coordinated by the MBAP. A controller/database 1013 may have bidirectional interfaces 1014 with all the BBP and bidirectional interfaces 1015 with the Receiver and Transmitter Converter Modules. The data in and out of the cluster is also routed to the Controller 1013 where it is input to various scheduling and other resource assignment functions that may be implemented in the MBAP. The interface between the Receiver and Transmitter Convert Module may support direct communication between their respective as required by processes such as enhanced nulling.

Figure 9:
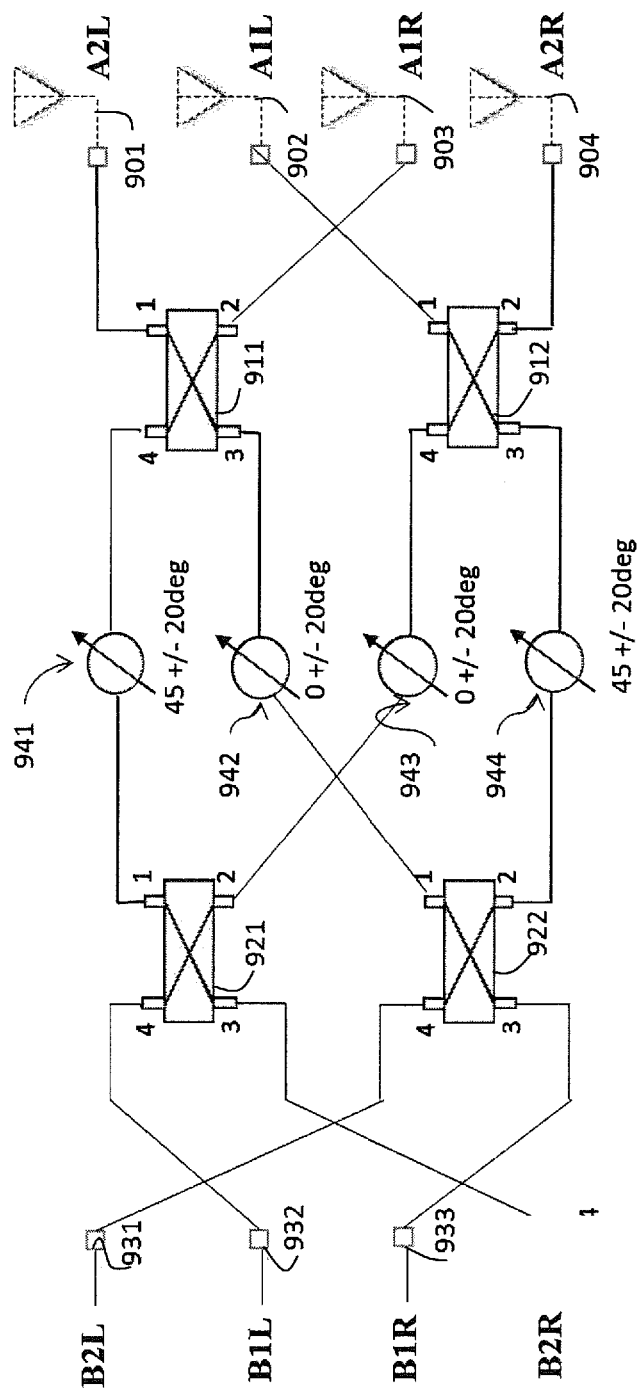
FIG. 9 is a diagram of how an adaptive analog BFN (Beam Forming Network) can be implemented, according to embodiments of the invention.

FIG. 9 is a diagram of how an adaptive analog BFN (Beam Forming Network) (e.g., BFN 1016 and 1017 in FIG. 8) can be implemented, according to embodiments of the invention. Four antennas 901-904 may input received data to a first set of quadrature hybrids 911 and 912. The output of theses hybrids may be input to a second set of quadrature hybrids 921 and 922, which produce 4 output beams 931 to 934. A set of 4 variable phase shifters 941 to 944 are provided in the paths that connect the first set of hybrids with the second set of hybrids. By adjusting the phase shift in these hybrids (911, 912, 921, 922), the resulting patterns received at 931 to 934 (and produced as beams) may be adjusted.

FIG. 9 illustrates an adjustable analog 1D BFN with 4 sensor antennas, where the pattern change be changed in the horizontal plane. Other implementations of 1D analog BFN may use a greater number of sensor antennas, provided that the number of beams must be equal to or greater than the number of sensor antennas. The analog 1D BFN shown in FIG. 9 can be expanded to a 2D BFN, where the pattern can be adjusted in both horizontal and vertical planes. Other techniques for adjusting the analog BFN may be used.

FIG. 10 illustrates the components for a SU-MU-Array assembled that uses a digital-only beamformer, according to embodiments of the invention. On the receiver side, an antenna array 1101 may be composed of L elements where each element is down-converted and digitized into I/Q quadrature components in the receive down-converter 1102. The receiver channel may require one channel for each antenna element and produces L I/Q outputs 1105. These L outputs are input to the FPGA 1108. The FPGA may perform digital 1D or 2D beamforming as the input from all antenna sensors is provided. Other processing related to channel estimation, additional isolation processing, etc. The FPGA may produces the same number of outputs as shown in FIG. 8. Specifically, M×(N+1) outputs may be produced, where N is the output for each beam, the +1 is for the sector antenna and M is the number of uncorrelated antennas required for the level of MIMO stream being supported. The output of the FPGA is input to the N+1 BBP. Each BBP requires M uncorrelated receiver antennas, which the FPGA creates from the L digitized antenna inputs 1105. The balance of the receiver functions are the same functions as were described in FIG. 8.

The transmitter functions may be analogous to the receiver functions described above. Each BBP may produce M transmitter outputs which are input 1106 to the FPGA 1108, which produces L digitized antenna outputs 1112 that are converted to analog signals, up-converted, amplified 1111 and input to each element in the transmitter antenna array 1104. The FPGA 1108 processing produces N beams, 1 sector antenna and up to M vertical arrays as shown pictorially in 1104. The additional flexibility provided through the FPGA beamforming enables the FPGA 1108 to adaptively control the vertical pattern of the array. Vertical control may also be possible with the analog beamforming implementation in FIG. 8, but the digital implementation shown in FIG. 9 may offer more precise control of beamforming.

The FPGA 1108 may accomplish the same operation mathematically as the BFN in FIG. 9. Each of "L" antennas from 1101 may be converted by the Receiver Down Converters 1102 to digital I/Q quadrature components 1109. These "L" I/Q digital signals are mathematically processed by the FPGA implementing digitally the BFN functions that are shown in FIG. 9. The precision and flexibility of digital processing enables more complex and more precise control of both 1D and 2D patterns in the FGPA than can be practically realized in analog BFN's.

Figure 11A:
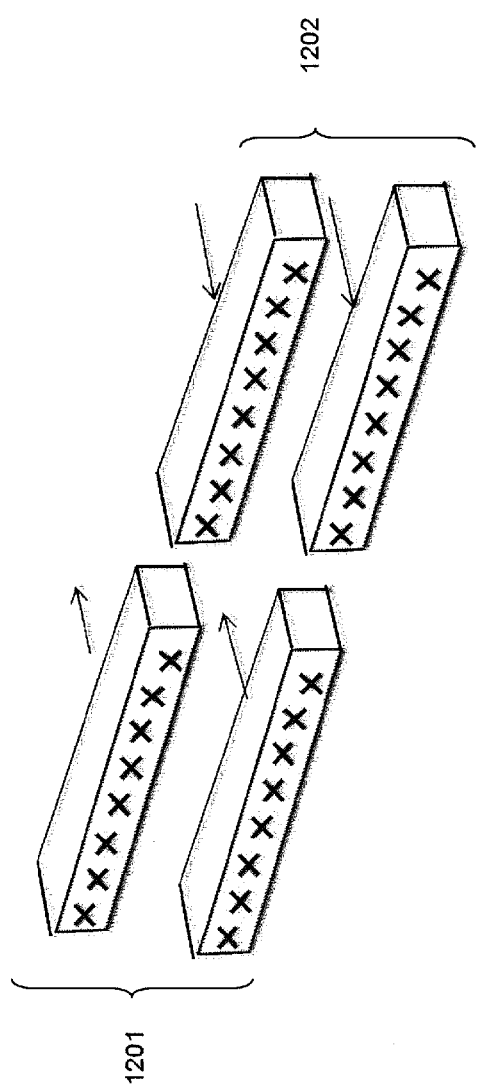
FIGS. 11A and 11B are diagrams of an antenna configuration, according to embodiments of the invention.

FIG. 11A is a diagram of an antenna configuration, according to embodiments of the invention. The embodiments illustrated in FIG. 8 or FIG. 10 may use an antenna configuration as shown in FIG. 11A, for example. There may be two receiver arrays 1201 one stacked above the other and two transmitter arrays 1202. Since each array may have orthogonal dual polarization output, there may be a total of four uncorrelated outputs and four uncorrelated inputs for each beam. In this manner, four stream MU or SU 802.11AC is supported by this array. This same array may be used for two channel 802.11n and one channel 802.11a.

The embodiments shown in FIGS. 8 and 10 may also use other antenna arrangements.

Figure 11B:
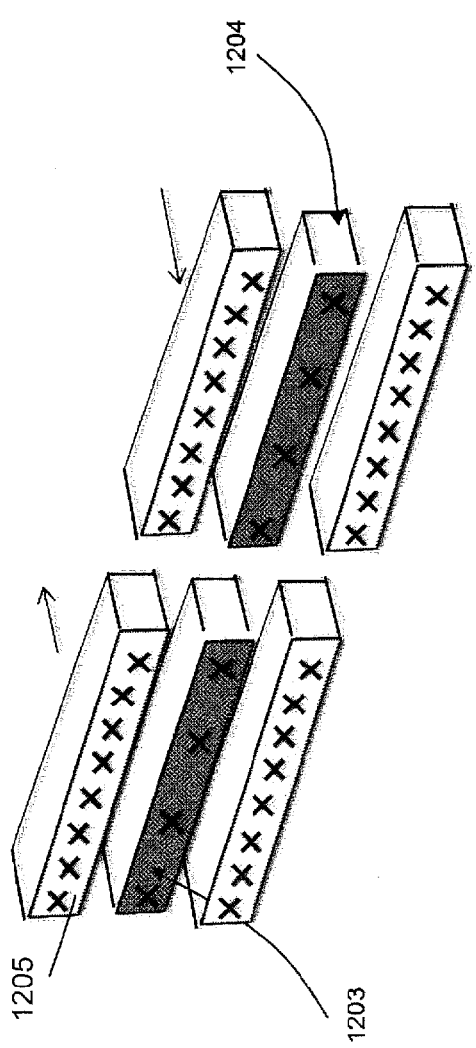

FIG. 11B is a diagram of another antenna configuration, according to embodiments of the invention. Two 2.4 GHz channel 802.11n arrays 1203, 1204 can be inserted between the two vertical arrays illustrated in FIG. 11A. The 2.4 GHz receiving array 1203 and the 2.4 GHz transmitting array 1204 may produce four directional beams with only four antennas. Because the 2.4 GHz array has half the number of elements as the 5 GHz arrays 1205, they are both the same physical size. Further, the separation of the two 5 GHz arrays 1205 enables the 2.4 GHz array (1203 or 1204) to be installed between them without increasing the overall physical size of the 5 GHz array 1205 alone. Alternate designs, such as two single polarization arrays can also be implemented.

The array illustrated in FIG. 11B may support 2.4 GHz with two stream 801.11n and 802.11a. The electronics behind the array can have either dedicated BBP for each band or shared BBP. If dedicated BBP is provided for each band, then the complete AP can support simultaneously four 802.11AC channels, each operating with up to 4 streams and four 2.4 GHz 802.11n channels, each operating with up to 2 streams.

As will be appreciated by one skilled in the art, aspects of the present invention may be embodied as a system, method or an apparatus. As such, any limitations commonly associated with the term "FPGA" should not be construed to be implementation technology specific; rather it can be embodied in any logical apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

What is claimed is:

1. A wireless communication system, comprising:
a plurality of N co-located Wi-Fi access points, each configured to communicate with at least one user equipment; and
a beamformer coupled to each of the access points and coupled to at least one antenna array, the antenna array including a plurality of antenna elements, wherein the at least one antenna array is configured to provide a plurality of M spatially uncorrelated beams for a coverage area of each of the N access points,
wherein the at least one antenna array includes antenna elements that are dual polarized,
wherein the beamformer is coupled to two arrays of dual polarized antenna elements, thereby providing M greater or equal to 4 spatially uncorrelated beams for a coverage area of each of the N access points, and
wherein the arrays are physically separated by at least 0.5 wavelengths.

2. The wireless communication system of claim 1, wherein the at least one antenna array is configured to provide N×M uncorrelated beams.

3. The wireless communication system of claim 2, wherein each of the N×M uncorrelated beams include transmitting beams and receiving beams.

4. The wireless communication system of claim 1, wherein each antenna array is configured to provide N beams, one for each coverage area of the N access points.

5. The wireless communication system of claim 1, wherein the at least one antenna array includes antenna elements for transmitting data to the at least one user equipment and antenna elements for receiving data from the at least one user equipment.

6. The wireless communication system of claim 1, wherein, for each coverage area of the N access points, the M spatially uncorrelated beams are respectively aligned to cover the same azimuth sector.

7. The wireless communication system of claim 1, wherein the at least one array provides a maximum of M=2 spatially uncorrelated beams for a coverage area of each of the N access points.

8. A wireless communication method, comprising:
communicating with at least one user equipment, by a plurality of N co-located Wi-Fi access points; and
providing, by two receiving antenna arrays and two transmitting antenna arrays, each including a plurality of antenna elements, a plurality of M spatially uncorrelated beams for a coverage area of each of the N access points, wherein a beamformer is coupled to each of the access points and coupled to the at least one antenna array, wherein the transmitting antenna arrays are separated by at least 0.5 wavelengths and the receiving antenna arrays are separated by at least 0.5 wavelengths.

9. The wireless communication method of claim 8, comprising providing, by the at least one antenna array, N×M uncorrelated beams.

10. The wireless communication method of claim 8, comprising providing, by each of the antenna arrays, N beams, one for each coverage area of the N access points.

11. The wireless communication method of claim 8, comprising aligning the M spatially uncorrelated beams to cover the same azimuth sector, for each coverage area of the N access points.

12. The wireless communication method of claim 8, comprising providing, by each antenna array, a maximum of M=2 spatially uncorrelated beams for each coverage area of each of the N access points, wherein each antenna array includes antenna elements that are dual polarized.

13. The wireless communication method of claim 8, comprising providing a plurality of M spatially uncorrelated beams according to a Single-User-MIMO process, Multi-User-MIMO process, or both simultaneously.

14. A communication device, comprising:
a plurality of Wi-Fi access points to exchange data with a beamformer;
at least one transmitting antenna array and at least one receiving antenna array, each coupled to the beamformer, wherein the at least one transmitting antenna array is able to transmit data from the beamformer to a user equipment via a plurality of spatially uncorrelated transmit beams for each area served by the access points, wherein the at least one receiving antenna array is able to receive data from a user equipment via a plurality of spatially uncorrelated receive beams for each area served by the access points, wherein the at least one transmitting antenna array comprise two transmitting antenna arrays separated by at least 0.5 wavelengths and the at least one receiving antenna array comprise two receiving antenna arrays separated by at least 0.5 wavelengths; and
a controller to allow said spatially uncorrelated beams based on a Single-User-MIMO process, Multi-User-MIMO process, or both simultaneously.

15. The communication device of claim 14, wherein the transmitting antenna array and the receiving antenna array each include dual polarized antenna elements.

16. The communication device of claim 14, wherein the controller is to align the plurality of spatially uncorrelated transmit beams and the plurality of spatially uncorrelated receive beams to cover the same azimuth sector in each of the areas served by the access points.

17. The communication device of claim 14, wherein the at least one transmitting antenna array provides a transmit beam for each of the access points and the at least one receive antenna array provides a receive beam for each of the access points, each transmit beam and receive uncorrelated from each other.

* * * * *